March 22, 1960
S. A. LARKIN ET AL
2,929,467
LUBRICATING DEVICE
Filed April 29, 1957
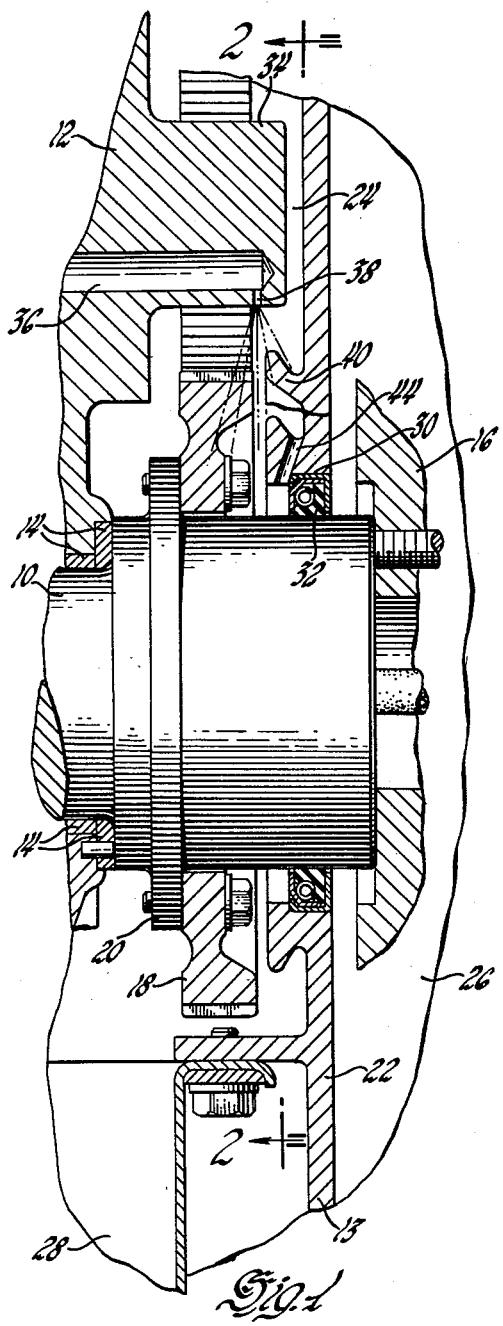
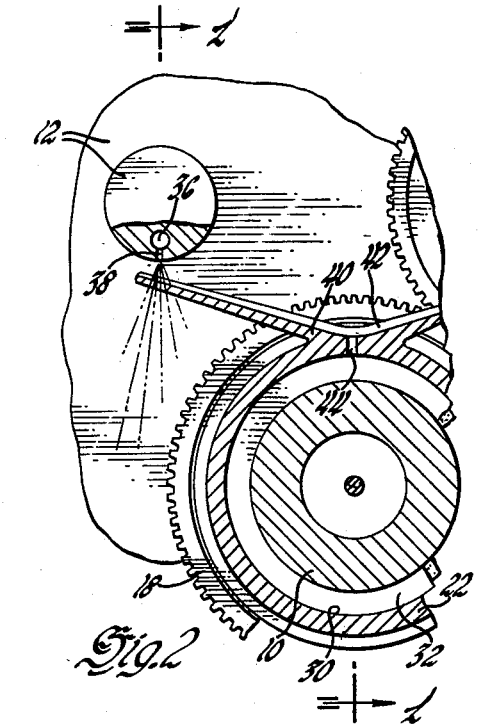
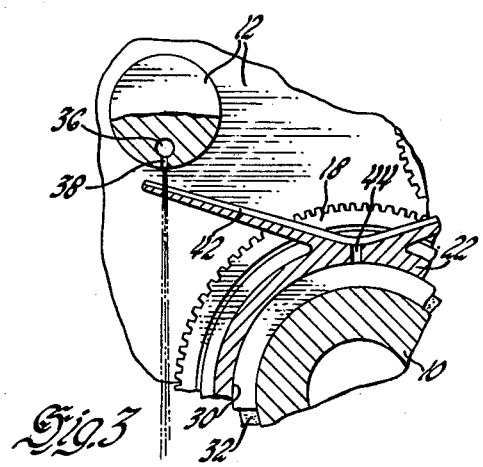
INVENTORS
Stephen A. Larkin &
BY Gordon W. Phillips
J. C. Thorpe
ATTORNEY

United States Patent Office 2,929,467
Patented Mar. 22, 1960

2,929,467

LUBRICATING DEVICE

Stephen A. Larkin and Gordon W. Phillips, Detroit, Mich., assignors to General Motors Corporation, Detroit, Mich., a corporation of Delaware Application April 29, 1957, Serial No. 655,737

10 Claims. (Cl. 184—6)

This invention relates to a lubricating device and more particularly contemplates an improved lubricating device for a mechanism subject to variable operating temperatures, the lubricating device being adapted to vary the quantity of lubricant supplied to the bearing surfaces of the mechanism in accordance with the viscosity of the lubricant as related to the operating temperatures of the mechanism. Such a lubricating device may be used severally or in combination with other lubricating means to provide all or a portion of the lubricant supplied to the several bearing surfaces in accordance with the operating temperatures of the mechanism and of the lubricant.

While the invention is applicable in its broader concepts to lubricating devices generally, it has particular application to a lubricating device adapted to supply lubrication to a rotary shaft seal for a mechanism such as an internal combustion engine or the like and is described in such an operational environment for the purposes of illustration. Such a seal separates a lubricant receiving chamber of the engine from a second chamber and is normally lubricated by the lubricant splash ocurring within the lubricant receiving chamber during normal engine operation. However, during engine starting periods, such lubricant splash is generally insufficient to properly lubricate the seal due to the relatively low temperature and consequential viscosity of the lubricant supply and to the low speed of the splash inducing parts of the engine. This results in the seal running dry during this starting period with resultant destructive overheating of the seal. Where seals of organic or resilient material are used, such overheating results in charring and cracking of the seal. Scoring and seizures result where metallic type seals are used. Consequently, it is desirable to supply such seals with some lubrication during the engine starting period. However, under normal conditions of engine operation, the direct application of the relatively warmer, more fluid lubricant to the surfaces of the seal would only serve to increase the quantity of oil tending to leak past the seal. The invention as applied in the illustrative embodiment therefore contemplates a lubricating device capable of supplying lubricant to the seals only during the engine starting and warm-up period.

The foregoing and other objects, advantages and features of the invention will be readily apparent from the following description of a preferred embodiment thereof, having reference to the accompanying drawing in which:

Figure 1 is a sectional view of a portion of an engine embodying a lubricating device constructed in accordance with the invention, the section of Figure 1 being taken adjacent a crankshaft seal and substantially on the line 1—1 of Figure 2;

Figure 2 is a fragmentary view taken substantially on the line 2—2 of Figure 1 with portions thereof broken away and in section and showing the operative condition of the lubricating device of the invention during the engine warm-up period; and Figure 3 is a view similar to Figure 2 showing the operative condition of the lubricating device of the invention during normal engine operation.

Referring more particularly to the drawing, Figure 1 shows one end of a crankshaft 10 of an internal combustion engine which is journaled in an engine frame 12 by bearings 14. A flywheel 16 is secured to the end of the crankshaft and a timing gear 18 is secured to flange 20 formed intermediate the bearings 14 and the flywheel end of the shaft. A flywheel housing member 22 embraces the end of the crankshaft intermediate the flywheel 16 and the timing gear 18 and serves as a cover member separating a lubricant receiving, timing gear compartment 24 from a flywheel compartment 26. The timing gear compartment 24 is in communication at its lower end with the engine crankcase 28 which serves as the sump for the engine lubricating system. The flywheel housing member 22 has a central hub portion which is counterbored, as indicated at 30, to mount a lip type seal 32 which is adapted to seal the lubricant within the timing gear and crankcase compartments from the flywheel compartment 26.

As indicated above, such a seal requires a certain amount of lubricant for proper operation. Under normal engine operating conditions lubricant is supplied to this seal by the lubricant splash or spray occurring within the timing gear and crankcase compartments; such splash depositing a quantity of lubricant on the end of the crankshaft which passes axially thereof to the seal. To insure proper lubrication of the seal during the engine starting and warm-up period, a lubricating device is provided in accordance with the invention. This device comprises a projection 34 on the frame member 12 in spaced relation to the crankshaft and the timing gear 18 and having a passage 36 therein connected to the pressurized lubricant supply system of the engine. The end of the passage 36 adjacent the flywheel housing member 22 is closed and an orifice passage 38 intersects the passage 36 adjacent its closed end and is adapted to direct a fine stream of oil downwardly therefrom within the timing gear compartment. During the engine starting period when the engine and consequently the lubricant temperatures are relatively low, the resultant high viscosity of the lubricant results in a diffusion or conical divergence of the stream of oil emanating from the orifice 38 as shown in Figures 1 and 2. A rib or trough 40 formed on the timing gear cover 22 intercepts a portion of this divergent stream and the portion of the oil stream collected by the trough drains into a reservoir 42 from which it is delivered to the seal through a radial passage 44 in the seal housing. As the temperature of the engine and the lubricant approach their normal operating temperatures with a consequential reduction in the viscosity of the lubricant, the divergence of the stream of oil emanating from the orifice 38 is decreased until this stream of oil completely by-passes the portion of the trough 44 adjacent the orifice as shown in Figure 3.

From the foregoing description, it will be readily apparent to those skilled in the art that the concepts underlying the lubricating device of the illustrative embodiment might be utilized in lubricating devices having other forms and applications without departing from the spirit and scope of the invention as defined in the following claims.

We claim:

1. In a mechanism adapted to be subjected to variable operating temperatures, two members mounted for relative movement and having cooperative surfaces in bearing engagement, a primary means for lubricating said surfaces when said mechanism is operating above a predetermined temperature, and secondary means for lubricating said surfaces when said mechanism is operating below a predetermined temperature, said secondary means including a source of pressurized lubricant, an aperture communicating with said source and adapted to discharge lubricant in a fine conical spray when said lubricant is below said temperature and to discharge lubricant in a narrow stream when said lubricant is above said temperature, and a collecting trough adjacent said aperture and extending partially into the path of said conical spray, said trough being adapted to collect and extending to deliver a portion of said lubricant spray to said surfaces when said lubricant is below said temperature.

2. A lubricating device for bearing surfaces of a mechanism subject to variable operating temperatures, said lubricating device being adapted to vary the quantity of lubricant supplied to said bearing surfaces in accordance with the operating temperature of said mechanism and comprising a source of pressurized lubricant, means including an aperture communicating with said source and adapted to discharge lubricant in a narrow stream when said lubricant is above a predetermined temperature and to discharge lubricant in a diffused stream when said lubricant is below said predetermined temperature, and a lubricant collecting member adjacent said aperture and extending partially into the path of said diffused stream to collect a portion of said diffused lubricant stream, and means for delivering said collected portion to said surfaces.

3. In combination with a mechanism subject to variable operating temperatures and having members mounted for relative movement with cooperative surfaces thereon in bearing engagement, a lubricating device adapted to supply lubricant to said surfaces in accordance with the operating temperatures of said mechanism and lubricant and comprising a source of lubricant, means including an aperture communicating with said source and adapted to discharge a stream of lubricant, said means diffusing said stream of lubricant in accordance with the operating temperatures of said mechanism and lubricant, a member adjacent said aperture and partially intersecting the path of said diffused stream to collect a portion of said diffused lubricant stream, and means for delivering said collected portion to said surfaces.

4. In combination with a rotary shaft seal separating a lubricant-receiving compartment from a second compartment within a mechanism subject to variable operating temperatures, a lubricating device adapted to meter lubricant to said seal when the lubricant of said mechanism is below a predetermined temperature, said device comprising a source of pressurized lubricant, means including an aperture communicating with said source and adapted to discharge a stream of lubricant within said lubricant receiving chamber, said means being adapted to diffuse said stream of lubricant in accordance with the temperature of the lubricant when the lubricant is below said predetermined temperature, and a member adjacent said aperture and partially intersecting the path of said diffused stream, said member being shaped to collect and deliver a portion of said diffused lubricant stream to said seal when the lubricant is below said predetermined temperature.

5. In combination with a rotary shaft seal in a mechanism such as an internal combustion engine or the like subject to variable operating temperatures, said seal separating a lubricant-receiving compartment from a second compartment within said mechanism and being normally lubricated by lubricant splash within said lubricant receiving chamber, a lubricating device adapted to insure proper lubrication of said seal when the lubricant of said mechanism is below a predetermined temperature, said device comprising a source of pressurized lubricant, means including an aperture communicating with said source and adapted to meter a fine stream of lubricant within said lubricant receiving chamber, said aperture diffusing said stream of lubricant in accordance with the temperature of the lubricant, and a member adjacent said aperture and extending within a portion of the path of said diffused stream when the lubricant is below said predetermined temperature, said member being formed to collect and deliver the intercepted portion of said diffused lubricant stream to said seal when the lubricant is below said predetermined temperature.

6. In combination with a mechanism having members mounted for relative movement with cooperative surfaces thereon in bearing engagement, a lubricating device adapted to meter lubricant to said surfaces in accordance with the viscosity of said lubricant and comprising a source of lubricant, means including an aperture communicating with said source and adapted to discharge a stream of lubricant, said aperture diffusing said stream of lubricant in accordance with the viscosity of said lubricant, and a lubricant collecting member adjacent said aperture and projecting within a portion of the path of said diffused stream, said member being adapted to collect the portion of said diffused lubricant stream intercepted thereby and to deliver the collected lubricant to said surfaces.

7. In combination with a mechanism having members mounted for relative movement with cooperative surfaces thereon in bearing engagement, a device for metering lubricant to said surfaces in accordance with the viscosity of said lubricant, said device comprising a source of lubricant, means including an aperture communicating with said source and adapted to discharge a stream of lubricant, the discharge characteristics from said aperture varying in accordance with the viscosity of said lubricant, and a member defining a trough adjacent said aperture, said trough being adapted to intersect, collect and deliver at least a portion of said lubricant stream to said surfaces when the lubricant is above a predetermined viscosity, said stream bypassing said trough when the lubricant is below said predetermined viscosity.

8. In combination with a mechanism having members mounted for relative movement with cooperative surfaces thereon in bearing engagement, a device for metering lubricant to said surfaces in accordance with the viscosity of said lubricant and comprising a source of lubricant, means including an aperture communicating with said source and adapted to discharge a stream of lubricant, the discharge characteristics of said stream varying in accordance with the viscosity of said lubricant, and a member defining a trough adapted to intersect, collect and deliver a portion of said lubricant stream to said surfaces, said collected portion varying in accordance with the viscosity of the lubricant.

9. A device for metering and distributing lubricant in accordance with the viscosity of the lubricant, said device including a source of lubricant under pressure, means including an aperture communicating with said source and adapted to discharge a stream of lubricant, the discharge characteristics of said stream from said aperture varying in accordance with the viscosity of said lubricant, and first and second lubricant receiving means for collecting varying portions of said lubricant stream in accordance with the viscosity thereof, at least a portion of said lubricant stream intersecting one of said receiving means when the lubricant is above a predetermined viscosity, and said stream bypassing said one receiving means when the lubricant is below said predetermined viscosity.

10. A device for metering and distributing lubricant in accordance with the viscosity of the lubricant, said device including a source of lubricant under pressure, means including an aperture communicating with said source and adapted to discharge a stream of lubricant, the discharge characteristics of said stream from said aperture varying in accordance with the viscosity of said lubricant, and first and second lubricant receiving means for collecting varying portions of said lubricant stream in accordance with the viscosity thereof, portions of said lubricant stream being directed toward both of said receiving means when the lubricant is above a predetermined viscosity, and said stream bypassing one of said receiving means when the lubricant is below said predetermined viscosity.

References Cited in the file of this patent

UNITED STATES PATENTS

| | | |
|---|---|---|
| 1,612,372 | Gussman | Dec. 28, 1926 |
| 2,256,754 | Schmitter | Sept. 23, 1941 |
| 2,263,073 | Duckstein | Nov. 18, 1941 |
| 2,878,894 | Andrews | Mar. 24, 1959 |

FOREIGN PATENTS

| | | |
|---|---|---|
| 622,880 | Great Britain | May 9, 1949 |